US008326771B2

(12) United States Patent
Roberts (10) Patent No.: US 8,326,771 B2
(45) Date of Patent: Dec. 4, 2012

(54) PREDICATIVE RECRUITMENT REPORTING AND MANAGEMENT

(75) Inventor: Jason Paul Roberts, North Richland Hills, TX (US)

(73) Assignee: Accenture Global Services Limited, Dublin (IE)

( * ) Notice: Subject to any disclaimer, the term of this patent is extended or adjusted under 35 U.S.C. 154(b) by 760 days.

(21) Appl. No.: 12/489,112

(22) Filed: Jun. 22, 2009

(65) Prior Publication Data

US 2010/0324960 A1   Dec. 23, 2010

(51) Int. Cl.
  *G06Q 10/00* (2012.01)
(52) U.S. Cl. ...................................................... 705/321
(58) Field of Classification Search ........................ None
  See application file for complete search history.

(56) References Cited

U.S. PATENT DOCUMENTS

| 8,015,048 B2* | 9/2011 | Bullock et al. ............... 705/7.14 |
| 2002/0133369 A1* | 9/2002 | Johnson ............................ 705/1 |
| 2006/0235884 A1* | 10/2006 | Pfenninger et al. ........ 707/104.1 |
| 2007/0214032 A1* | 9/2007 | Sciuk ................................. 705/8 |
| 2009/0187446 A1* | 7/2009 | Dewar ............................. 705/7 |
| 2010/0106566 A1* | 4/2010 | Al-Otaibi et al. ............... 705/11 |

* cited by examiner

*Primary Examiner* — Jonathan Ouellette
(74) *Attorney, Agent, or Firm* — Fish & Richardson P.C.

(57) ABSTRACT

Methods, computer-readable media, and apparatuses process data for an employee requisition, in which a contracted company may assume responsibility for supporting portions of the requisition process by filtering candidates. Consequently, only qualified candidates for a specified job assignment are interviewed by the contracting company (client). By looking at requisitions that are in process and focusing on whether or not they have achieved an expected threshold of activity, a requisition system can predict bottlenecks in the process before the requisition is filled. An interprocess report organizes and acts on data to provide a management team a prediction of how a recruitment team will perform by individual recruiter and requisition level. In addition, actions are identified that the manager can initiate to correct issues early in the requisition process in order to reduce an impact on the client as per a service level agreement.

12 Claims, 9 Drawing Sheets

Interprocess Report

| | | Editable Thresholds | | | | | |
|---|---|---|---|---|---|---|---|
| | ColorCode Start Age | | Days Open | | | | |
| | | | 0 | | | | |
| | | | 30 | | | | |
| | | | 46 | | | | |
| | | Candidate Volume Thresholds | Added to Requisition | Screening | Send to Mgr | Interviewing/Assessment | Offer |
| | | | | 15 | 20 | 25 | 35 |
| | | | 5 | 5 | 3 | 3 | 1 |
| | | Candidate Volumes | | | | | |
| Requis | External Job Title | Days Open | Requisition Recruiter | Added to Requisition | Screening | Send to Mgr | Interviewing/Assessment | Offer |
|---|---|---|---|---|---|---|---|---|
| 5663 | ACCTG TEAM LD | 19 | Recruiter_1 | 5 | 5 | 5 | 5 | |
| 6192 | MARKETING MANAGER | 20 | Recruiter_2 | 78 | 1 | 1 | 1 | |
| 6259 | Parts Supply Team Leader IV | 20 | Recruiter_3 | 13 | 3 | | | |
| 6245 | BUSINESS ANALYST II | 22 | Recruiter_4 | 6 | 5 | 5 | | |
| 6240 | BUSINESS ANALYST (BLACK,ROBERT | 23 | Recruiter_5 | 59 | 2 | | | |
| 6178 | ADMINISTRATIVE ASSISTANT I (208 HayPts) | 23 | Recruiter_6 | 2 | 2 | 2 | | 1 |
| 6215 | SENIOR ATTORNEY | 24 | Recruiter_7 | 72 | 43 | | | |
| 6180 | Scientific and Safety Market Manager | 24 | Recruiter_8 | 19 | 10 | | | |
| 6225 | PATENT FACILITATOR IV | 25 | Recruiter_9 | 4 | 4 | 4 | | 1 |
| 6202 | IA SPECIALIST | 26 | Recruiter_10 | 4 | 3 | | 5 | 2 |
| 6208 | CUSTOMER BUSINESS PARTNER I | 26 | Recruiter_11 | 131 | 103 | 12 | | 2 |
| 6074 | Utilities Mechanical Engineer- Boiler/Water Tr | 27 | Recruiter_12 | 25 | 11 | | | |
| 6176 | OPERATIONS CONSULTANT II | 27 | Recruiter_13 | 4 | 4 | 5 | | |
| 6173 | IT Functional/Tech Lead (SAP SD Pricing) | 27 | Recruiter_14 | 20 | 7 | 5 | | |
| 6179 | ENGINEER II ELECTRICAL | 27 | Recruiter_15 | 11 | 1 | 1 | | |
| 6183 | TECHNICAL LEADER I - PROCESS | 27 | Recruiter_16 | 7 | 7 | | | |
| 6181 | Sr. Customer Marketing Manager | 31 | Recruiter_17 | 6 | 4 | 4 | | 4 |
| 6064 | Market Development Manager | 31 | Recruiter_18 | 240 | 137 | 5 | | 3 |
| 6170 | CLINICAL STUDIES TECHNICAL LEADER I | 31 | Recruiter_19 | 23 | | | | |
| 6155 | CLINICAL DATA MGMT SPECIALIST IV | 32 | Recruiter_20 | 45 | 12 | | | |
| 6101 | Electrical Engineer II | 32 | Recruiter_21 | 41 | 23 | | | |
| 6100 | RELIABILITY LEADER | 32 | Recruiter_22 | 24 | 15 | | | |

PREDICATIVE RECRUITMENT REPORTING AND MANAGEMENT

FIELD

This invention relates generally to monitoring an employment requisition and to initiating corrective actions during the hiring process.

BACKGROUND

Recruitment often refers to the process of screening and selecting qualified people for a job at an organization or firm. The recruitment industry is typically classified by four types of agencies: employment agencies, recruitment websites and job search engines, "headhunters" for executive and professional recruitment, and in-house recruitment. Stages in recruitment include sourcing candidates by advertising or other methods, screening and selecting potential candidates using tests or interviews, making offers of employment to successful candidates, and hiring candidates who accept offers of employment. In order to meet recruiting objectives, mid-size and large-size organizations often retain professional recruiters or outsource some of the process to recruitment agencies to attract and select employees from outside the organization.

Recruiters aim to channel candidates into the hiring organizations application process. As a general rule, the agencies are paid by the companies and not the candidates. A recruitment agency historically has a physical location. A candidate may visit a local branch for a short interview and an assessment before further consideration. Recruitment consultants then work to match their pool of candidates to their clients' open positions. Suitable candidates are then short-listed and put forward for an interview with potential employers on a temporary ("temp") or permanent ("perm") basis.

However, a recruitment agency is not limited to a physical location. For example, recruiting may encompass Internet recruitment websites. Such sites typically have two main features: job boards and a resume/curriculum vitae (CV) database. Job boards allow member companies to post job vacancies. Websites typically capture candidate details and then pool them in client-accessed candidate management interfaces (also online).

The recruiting process includes job analysis, sourcing, screening and selection, and onboarding. The recruitment process typically starts with job analysis by documenting the actual or intended requirement of the job to be performed. Sourcing involves 1) advertising, a common part of the recruiting process, often encompassing multiple media, such as the Internet, general newspapers, job ad newspapers, professional publications, window advertisements, job centers, and campus graduate recruitment programs; and 2) recruiting research, which is the proactive identification of relevant talent who may not respond to job postings and other recruitment advertising methods. Screening and selection determines which candidates are qualified for the job by assessing the candidates' skills. Suitability for a job is typically assessed by looking for skills, e.g., communication, typing, and computer skills. Qualifications may be shown through résumés, job applications, interviews, educational or professional experience, the testimony of references, or in-house testing. Onboarding pertains to the introduction process for a new employee and is included in the recruitment process for retention purposes. A well-planned introduction often helps new employees become fully operational quickly and is often integrated with a new company and environment.

The recruitment is traditionally managed through results-based reporting based on the time necessary to fill a requisition (typically between 45 and 60 days). Consequently, a lagging indicator may result in identifying a problem late in the recruiting process so that corrective measures cannot be initiated in an expeditious manner. As can be appreciated, being able to recruit qualified employees within a desired period time is an important objective for the recruiting process.

BRIEF SUMMARY

The present invention provides methods, apparatuses, and computer-readable media for monitoring data for an employee requisition. A contracted company may assume responsibility for supporting portions of the requisition process by filtering candidates so that only qualified candidates for a specified job assignment are interviewed by the contracting company. By looking at requisitions that are in process and focusing on whether or not they have achieved in accordance with an expected threshold of activity, a requisition system can predict bottlenecks in the process before the requisition is filled.

With another aspect of the invention, an interprocess report organizes and acts on data to provide a management team a prediction of how a recruitment team performs by individual recruiter and requisition level. In addition, actions are identified that the manager can take to correct issues early in the requisition process to reduce an impact on a service level agreement (SLA) for a client. When requisition information is combined with a distinct methodology for managing deviations from expectations, the manager is able to correct deviations before they impact client expectations. Consequently, a manager can direct effort and resources to requisitions that are in trouble earlier in the requisition process, thus resulting in a smaller, less costly correction to the process and avoidance of penalties from missed service level agreements.

For open requisitions, a user can review the number of candidates that have been reached at each requisition stage during the requisition. If the number of candidates is less than the corresponding threshold for the requisition stage, then the displayed data is highlighted in a focus area. When a requisition misses a throughput threshold, an indication may be displayed to indicate what action can be taken by management in accordance with a predictive management matrix.

BRIEF DESCRIPTION OF THE DRAWINGS

The present invention is illustrated by way of example and not limited in the accompanying figures in which like reference numerals indicate similar elements and in which.

DETAILED DESCRIPTION

An interprocess report provides monitoring data for an employee requisition. A contracted company may assume responsibility for supporting portions of the requisition process by filtering candidates so that only qualified candidates for a specified job assignment are interviewed by the contracting company. By looking at requisitions that are in process and focusing on whether or not they have achieved an expected threshold of activity, a requisition system can predict bottlenecks in the process before the requisition is filled. Consequently, corrective action may be initiated so that the requisition process is brought back on track before penalties can accrue for not meeting contracted obligations by the contracted company.

With another aspect of the invention, an interprocess report organizes and acts on data to provide a management team a prediction of how a recruitment team will perform by individual recruiter and requisition level. In addition, actions are identified that the manager can take to correct issues early in the requisition process to reduce an impact on a client as per a service level agreement (SLA).

Traditional systems typically do not have the ability to identify bottlenecks in the recruitment process in real time. When requisition information is combined with a distinct methodology for managing deviations from expectations, the manager is able to correct deviations before they impact client expectations. Consequently, a manager can direct effort and resources to requisitions that are in trouble earlier in the requisition process, thus resulting in a smaller, less costly correction to the process and avoidance of penalties from missed service level agreements.

For open requisitions, a user can review the number of candidates that have been reached at each requisition stage during the requisition. If the number of candidates is less than the corresponding threshold for a requisition stage, then the displayed data is highlighted in a focus area. When a requisition misses a throughput threshold, an indication may be displayed to indicate what action can be taken by management. The action may be in accordance with a predictive management matrix.

Figure 1:
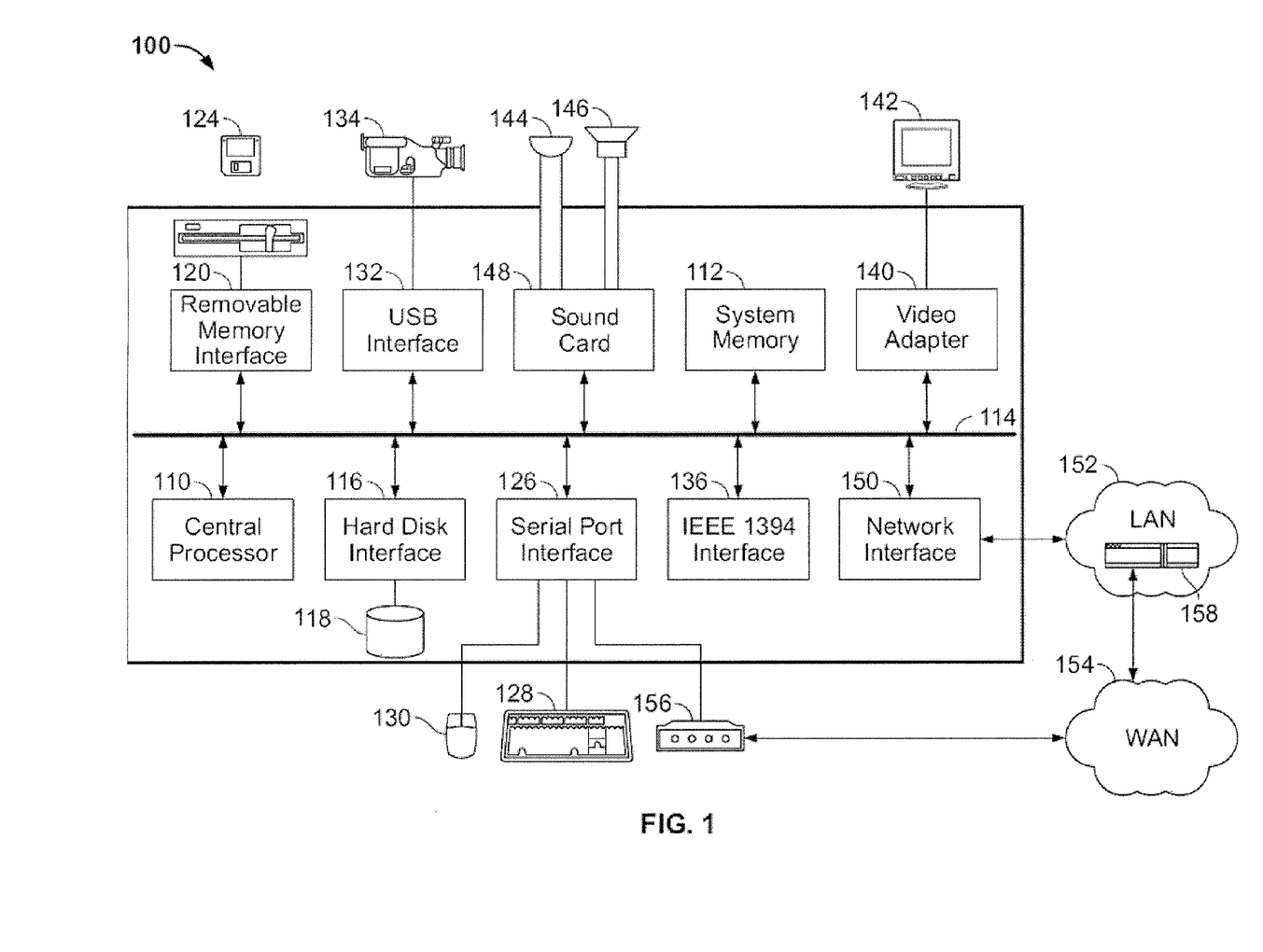
FIG. 1 shows a computer system used in an advanced payment integrity system in accordance with an embodiment of the invention.
Figure 2:
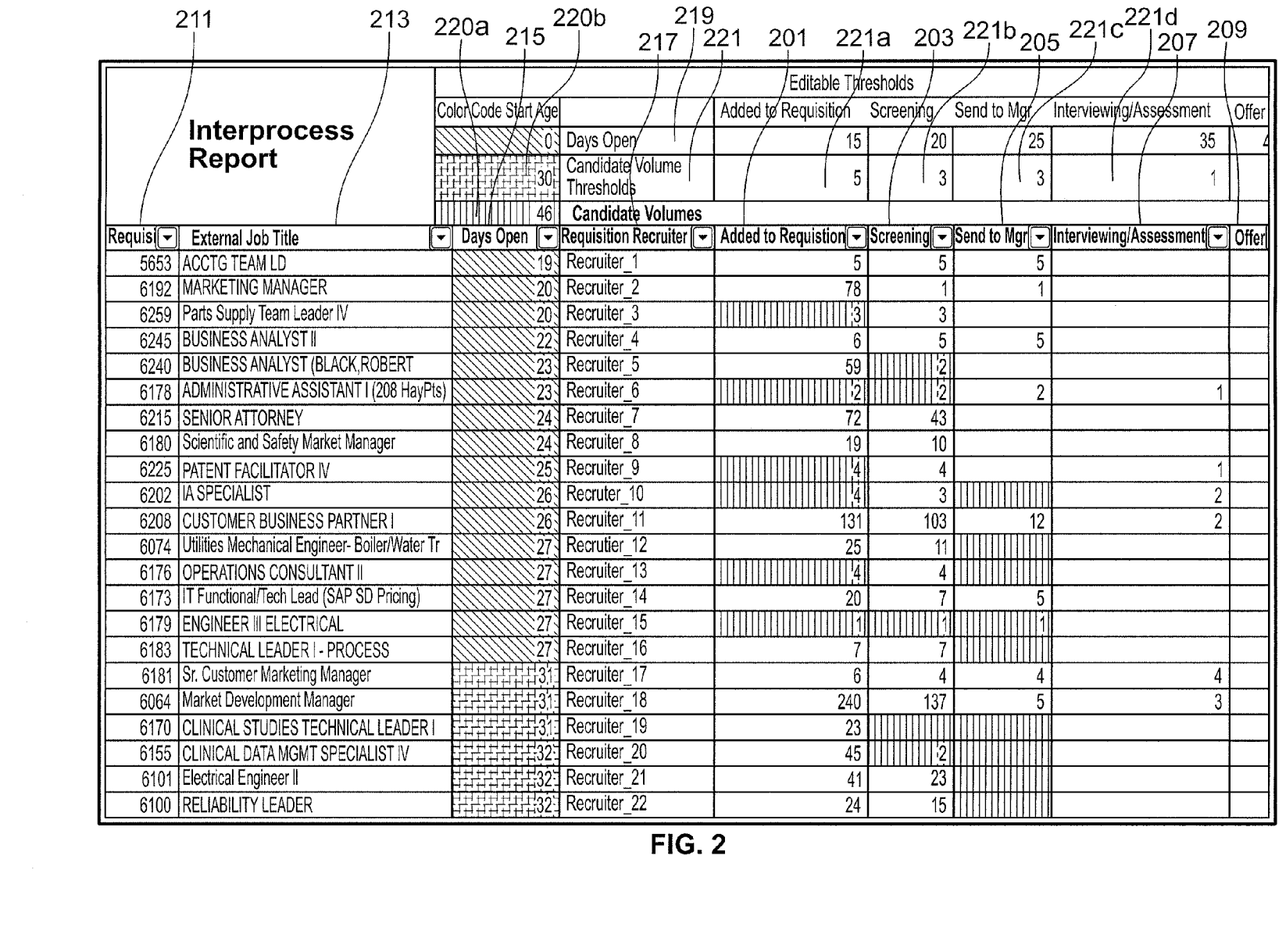
FIG. 2 shows a screenshot of an exemplary interprocess report in accordance with an embodiment of the invention.
Figure 3:
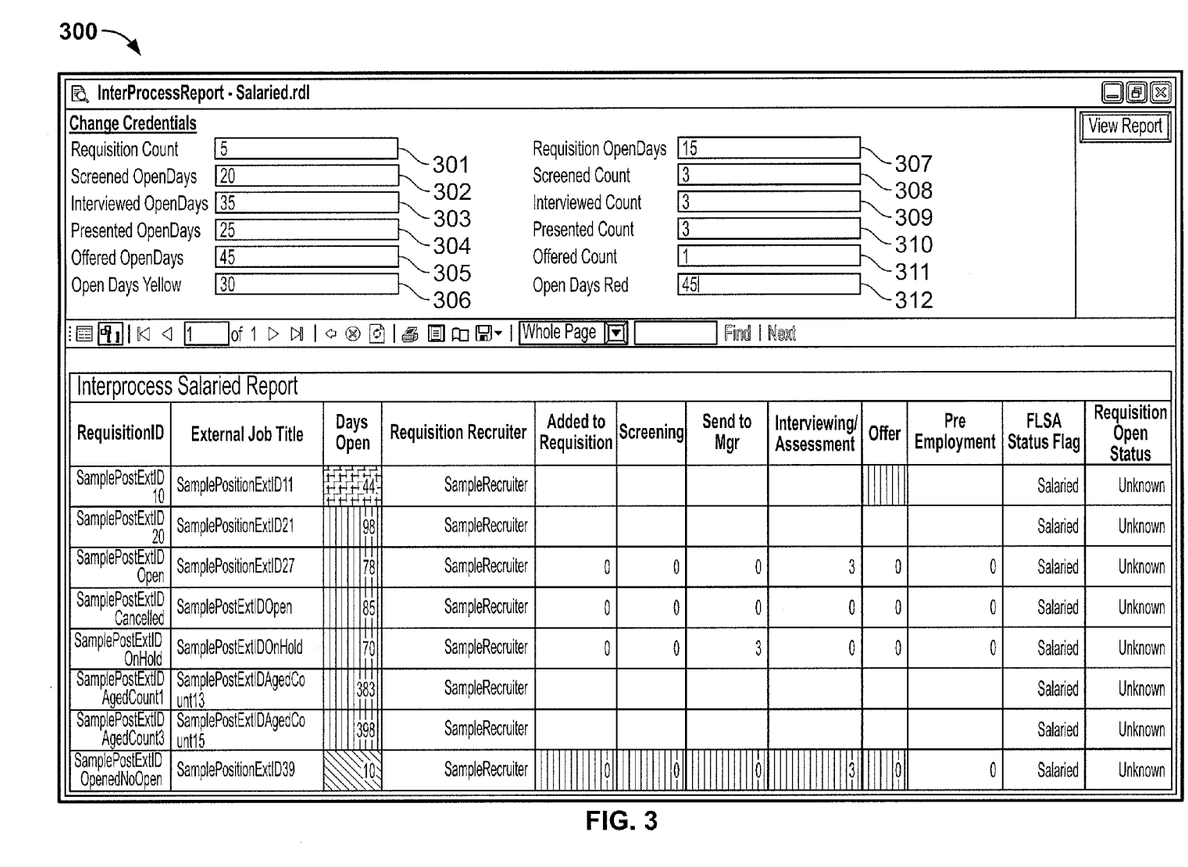
FIG. 3 shows a web-based screenshot of an exemplary interprocess salaried report in accordance with an embodiment of the invention.

Referring to FIG. 1, elements of the present invention may be implemented with computer systems, such as the system 100. System 100 may support interprocess report 200 (as shown in FIG. 2) and interprocess report 300 (as shown in FIG. 3). System 100 consequently executes processes 400, 500, 600, 700, 800, and 900 corresponding to FIGS. 4-9, respectively, in accordance with aspects for the invention as disclosed herein.

Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 1 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

According to an aspect of the invention, the status of an employment requisition is monitored. As will be discussed, if predetermined thresholds are not attained during different stages of the employment requisition, corrective action can be initiated so that the employment requisition can be completed in a timely basis with a desired degree of quality.

FIG. 2 shows screenshot 200 of an exemplary interprocess report for an employee requisition in accordance with an embodiment of the invention. Screenshot 200 may be obtained from an Excel spreadsheet by using conditional formatting algorithms to identify flagged requisitions. The requisition interval is partitioned into different stages. As shown in screenshot 200, referred stages include added to requisition stage 201, screening stage 203, send to manager stage 205, interviewing/assessment stage 207, offer stage 209, and pre-employment stage (not explicitly shown in FIG. 2) as described below:

Added to Requisition stage 201: Candidates in this stage have been added to the requisition for review. Candidates may apply directly to the requirements online or recruiters may identify candidates who match the role.

Screening stage 203: Candidates in this stage have completed a phone screen with the recruiter.

Send to Manager stage 205: Candidates in this stage have been sent to the hiring manager for review.

Interviewing/Assessment stage 207: Candidates in this stage have been scheduled for and/or completed interviews for an open requisition.

Offer stage 209: Candidates in this stage have been selected to receive an offer for employment.

Pre-employment stage: Candidates in this stage have a pre-employment status.

Screenshot 200 is organized into different columns as described in Table 1.

TABLE 1

REPORT FIELD DEFINITIONS

| Column Name | Description | Threshold |
|---|---|---|
| Requisition Number (211) | Unique identifier for the requisition or job posting. | N |
| External Job Title (213) | Job title assigned to the requisition or job posting. | N |
| Days Open (215) | Sum of days the requisition has been open minus Hold Days. (Today's Date − Open Date) − Hold Time | Y |
| Requisition Recruiter (217) | Full name of the recruiter assigned to the requisition. | N |
| Added to Requisition (201) | Count of all candidates who have achieved Added to Requisition status against the requisition. | Y |
| Screened (203) | Count of all candidates who have achieved Screened status against the requisition | Y |
| Presented (205) | Count of all candidates who have achieved Presented status against the requisition. | Y |
| Interviewed (207) | Count of all candidates who have achieved Interviewed status against the requisition. | Y |
| Offered (209) | Count of all candidates who have achieved Offered status against the requisition. | Y |
| Pre-Employment (not explicitly shown in FIG. 2) | Count of all candidates who have achieved Pre-Employment status against the requisition. This is NOT the same as either Accepted or Hired. | N |
| Requisition Open Status (not explicitly shown in FIG. 2) | Indicator that identifies contextual requisition statuses (not to be confused with other requisition statuses such as Open, Hold, Cancelled, Closed, etc). This field does not affect metrics in any way. This is merely a subjective field based on recruiter input, and has absolutely no bearing on metric calculations. | N |

Screenshot 200 illustrates different metrics (counts) as determined by system 100 when executing processes 500, 600, 700, 800, and 900 as described in Table 2. The different metrics are determined for each requisition and inserted in the corresponding cells as shown in screenshot 200.

TABLE 2

METRICS AND MEASUREMENTS

| Metric Name | Type | Description | Calculation Definition |
| --- | --- | --- | --- |
| Days Open | Sum | Sum of number of days the requisition has been open minus Hold Days*. | (Today's Date − Open Date) − Hold Time * |
| Added to Requisition | Count | Count of all candidates who have achieved Added to Requisition status against the requisition. | Count(Job Applications where status = Added to Requisition) |
| Screened | Count | Count of all candidates who have achieved Screened status against the requisition | Count(Job Applications where status = Screened) |
| Presented | Count | Count of all candidates who have achieved Presented status against the requisition. | Count(Job Applications where status = Presented) |
| Interviewed | Count | Count of all candidates who have achieved Interviewed status against the requisition. | Count(Job Applications where status = Interviewed) |
| Offered | Count | Count of all candidates who have achieved Offered status against the requisition. | Count(Job Applications where status = Offered) |
| Pre-Employment | Count | Count of all candidates who have achieved Pre-Employment status against the requisition. | Count(Job Applications where status = Pre-Employment) |

Each requisition is associated with requisition number 211, external job title 213, and the assigned requisition recruiter 217. Only one requisition recruiter is typically assigned to a given requisition while the requisition recruiter may be assigned to more than one requisition. However, embodiments of the invention may associate more than one requisition recruiter to a given requisition.

Interprocess report 200 conditionally formats fields (cells) to convey information on requisition data below the threshold values. There are two primary thresholds: requisition stage thresholds 221 and requisition days open threshold 220a. Also, each requisition stage is specified by the number of days that the requisition is open with days open parameter 219. Requisition stage thresholds 221 specify the minimum number requisition candidates that have been achieved for an associated requisition stage. If the number of requisition candidates is below threshold 221, then the requisition is flagged in the appropriate cell in columns 201, 203, 205, 207, or 209. Five primary thresholds (associated with requisition thresholds 221) drive conditional formatting against each of the five primary requisition stages: added to requisition threshold 221a, screened threshold 221b, presented threshold 221c, interviewed threshold 221d, and offered threshold (not explicitly shown). For each of the requisition stage thresholds, data cells containing counts below the fixed threshold are flagged by highlighting the cell in red.

Requisition days open threshold 220a specifies the maximum number of days that a requisition is open before a requisition is flagged (e.g., in red) in days open column 215. Flagging the requisition in column 215 typically denotes that the requisition has not been completed in accordance with the service level agreement. However, additional colors (e.g., yellow and green) may be used to denote a number of days within the specified duration of a service level agreement. Threshold 220a is based on the number of days the requisition has been open minus hold days and hiring authority delay days. With an embodiment, the days open for a requisition is are determined by:

$$\text{days open} = (\text{Today's Date} - \text{Open Date}) - \text{Hold Time} \quad (\text{EQ. 1})$$

The hold time as shown in EQ. 1 is the time that a requisition is held in suspension and is typically specified by the contracting company.

The corresponding days open cell may be highlighted in yellow when the corresponding requisition, based on days open (using EQ. 1), falls between the yellow threshold 220b and red threshold 220a. If the days open is equal to or greater than red threshold 220a, the cell is highlighted in red. Otherwise, the cell is highlighted in green.

Screenshot 200 utilizes days open threshold 219 and candidate volume threshold 221 if the thresholds are specified by a user. However, if the thresholds are not specified, default thresholds may be used for report 200 for different position types (e.g., hourly and salaried) as exemplified in Table 3.

TABLE 3

DEFAULT THRESHOLDS

| | | DEFAULT Thresholds | |
| --- | --- | --- | --- |
| Type | Description | Days Open | Candidate Volume |
| Hourly | Added to Requisition | 15 | 5 |
| Hourly | Screened | 20 | 3 |
| Hourly | Presented | 25 | 3 |
| Hourly | Interviewed | 35 | 1 |
| Hourly | Offered | 45 | 1 |
| Salaried | Added to Requisition | 15 | 5 |
| Salaried | Screened | 20 | 3 |
| Salaried | Presented | 25 | 3 |
| Salaried | Interviewed | 35 | 1 |
| Salaried | Offered | 45 | 1 |

While this report does not require drill-down or drill-through, it may be desirable for the report to allow users to edit threshold values and re-generate the report against the user-editable values. Export of the results may be tested in Excel and PDF formats.

FIG. 3 shows screenshot 300 of an exemplary interprocess salaried report in accordance with an embodiment of the invention. Screenshot 300 is similar to screenshot 200; however, screenshot 300 is adapted for web-based usage. Parameters 301-305 and 307-311 specify thresholds (corresponding to thresholds 219 and 221) for the different requisitions stages as discussed above. Also, parameters 306 and 312 specify the yellow threshold (corresponding to yellow threshold 220b) and the red threshold (corresponding to red threshold 220a) for highlighting days open cells.

While screenshot 300 is similar to screenshot 200, a web-based approach may reduce or eliminate data manipulations performed on the backend. For example, each number shown in screenshot 200 corresponds to one line of data. Consequently, the amount of backend data manipulations without a web-based approach can be substantial. Instead of displaying thousands of rows of data that must be filtered and manipulated through pivot tables, the web based application can present the final view of the report with activity counts in each column. Also, the web based system can be accessed from any location with a browser, depends on faster, more powerful server processors to complete calculations compared to PC processors, exports to multiple display formats including PDF and Excel, can be linked to other online locations, can have web based security added, can be accessed by multiple people at one time, and reduces load times when accessed across long distances.

Figure 4:
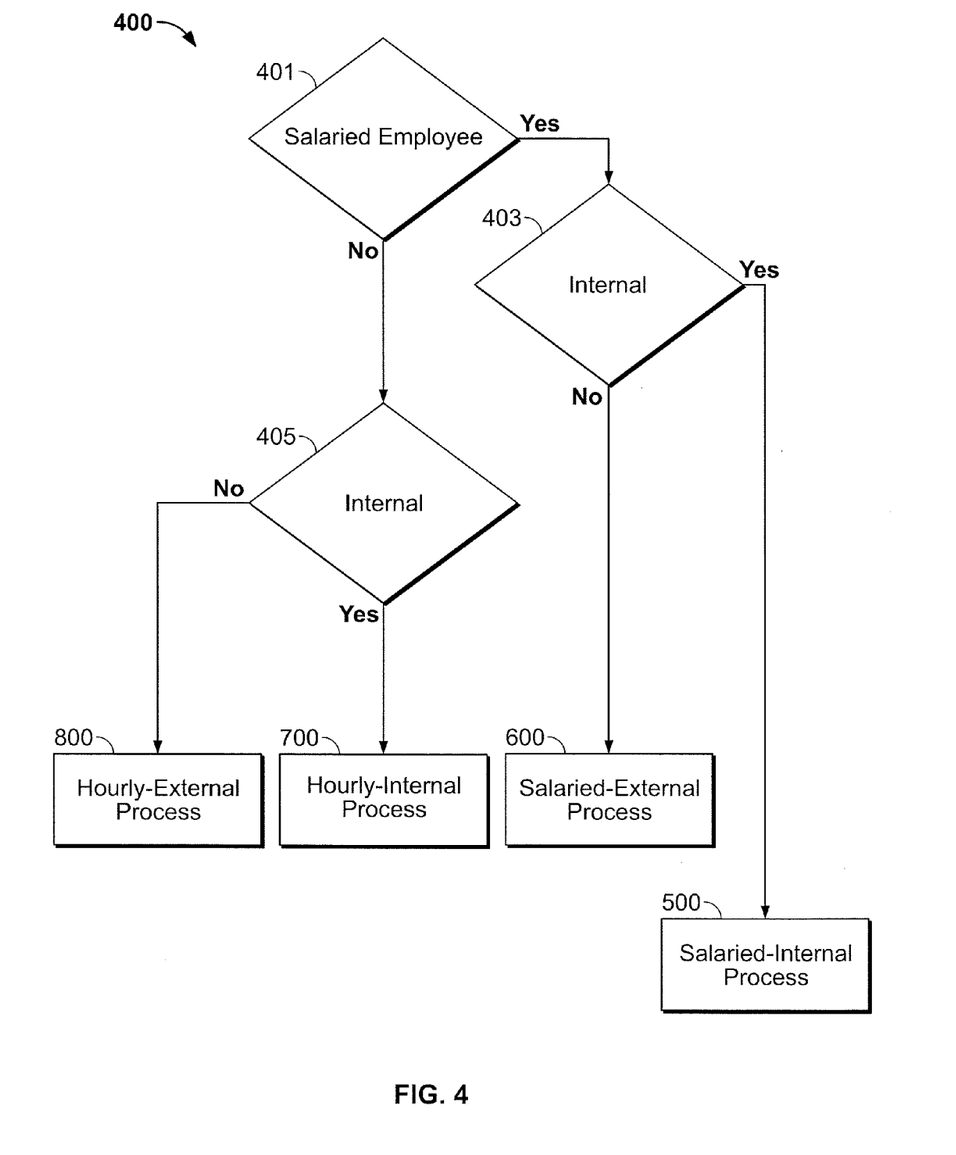
FIG. 4 shows a flow diagram for processing requisitions in accordance with an embodiment of the invention.

FIG. 4 shows flow diagram 400 for processing requisitions in accordance with an embodiment of the invention. Requisitions are classified by requisition type (e.g., external or internal) and by position type (hourly or salaried). For example, a requisition may be directed to candidates that are internal or external to the hiring company for positions that are classified as hourly (typically factory) or salaried (typically professional). External requisitions may allow internal applicants. Internal requisitions typically do not allow external applicants and are often used to facilitate movement within the organization without adding headcount expense. As determined by steps 401, 403, and 405, system 100 processes requisition data by process 500, 600, 700, or 800 corresponding to salaried/internal, salaried/external, hourly-internal, and hourly-external, respectively. In addition, as will be discussed, all requisitions (regardless of the requisition type and position type) can be processed based on different recruiting scenarios.

Figure 5:
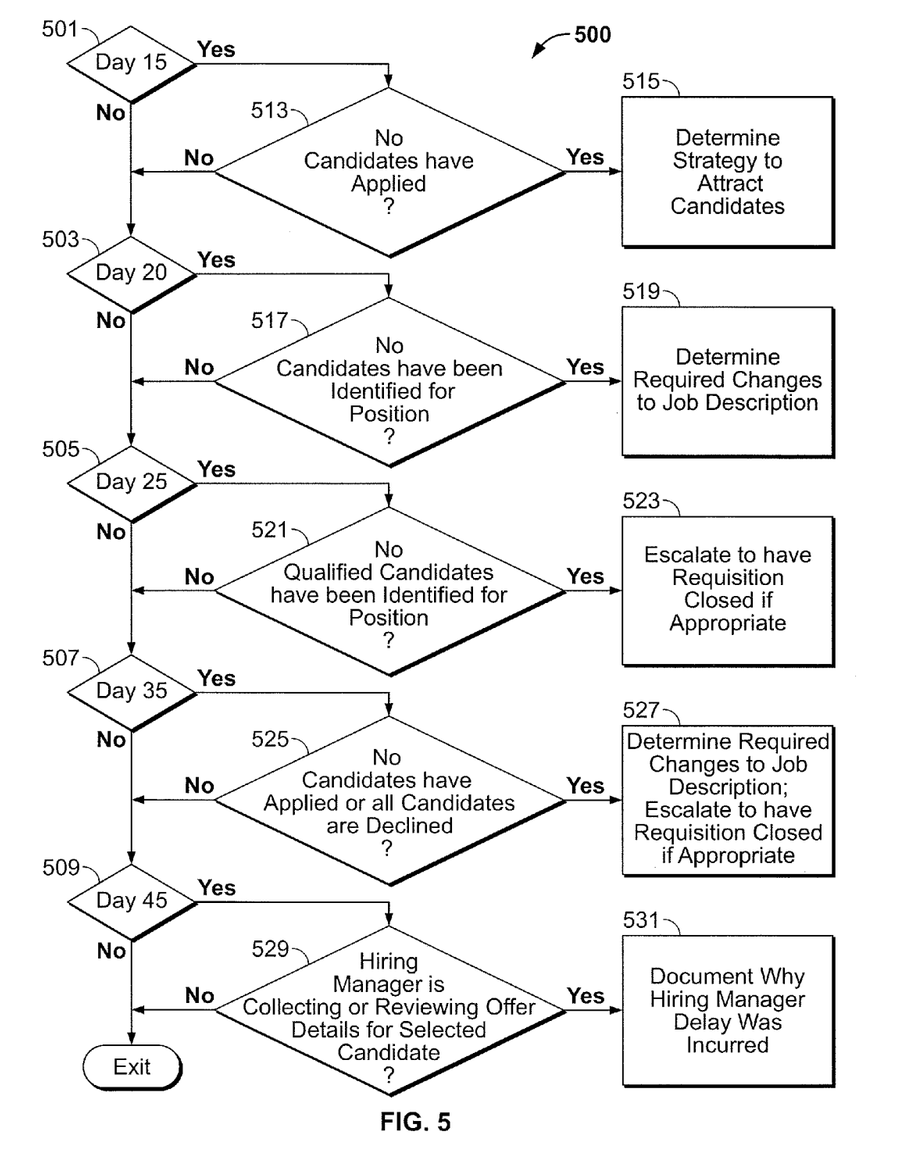
FIG. 5 shows a flow diagram for processing internal requisitions for salaried employees in accordance with an embodiment of the invention.

FIG. 5 shows flow diagram 500 for processing internal requisitions for salaried employees in accordance with an embodiment of the invention. The requisition interval is partitioned into the Added to Requisition stage (step 501: between 0 and 15 days), Screening stage (step 503: between 16 and 20 days), Sent to Manager (Presented) stage (step 505: between 21 and 25 days), Interviewing/Assessment stage (step 507: between 26 and 35 days), and Offer stage (step 509: between 36 and 45 days). Steps 513, 517, 521, 525, and 529 determine whether the number of candidates at a requisition stage is less than the corresponding candidate volume thresholds. As previously discussed with FIGS. 2 and 3, requisition stages are configured according to the number of open days and candidate volume (e.g., fields 219 and 221 as shown in FIG. 2 and fields 301-305 and 307-311 as shown in FIG. 3). If a decision point is detected by steps 513, 517, 521, 525, or 529, a corresponding action may be indicated on a computer display corresponding to steps 515, 519, 523, 527, or 531, respectively. When feasible, corrective actions invoked by processes 500, 600, 700, and 800 utilize a primary strategy rather than a secondary strategy because of cost considerations.

Figure 6:
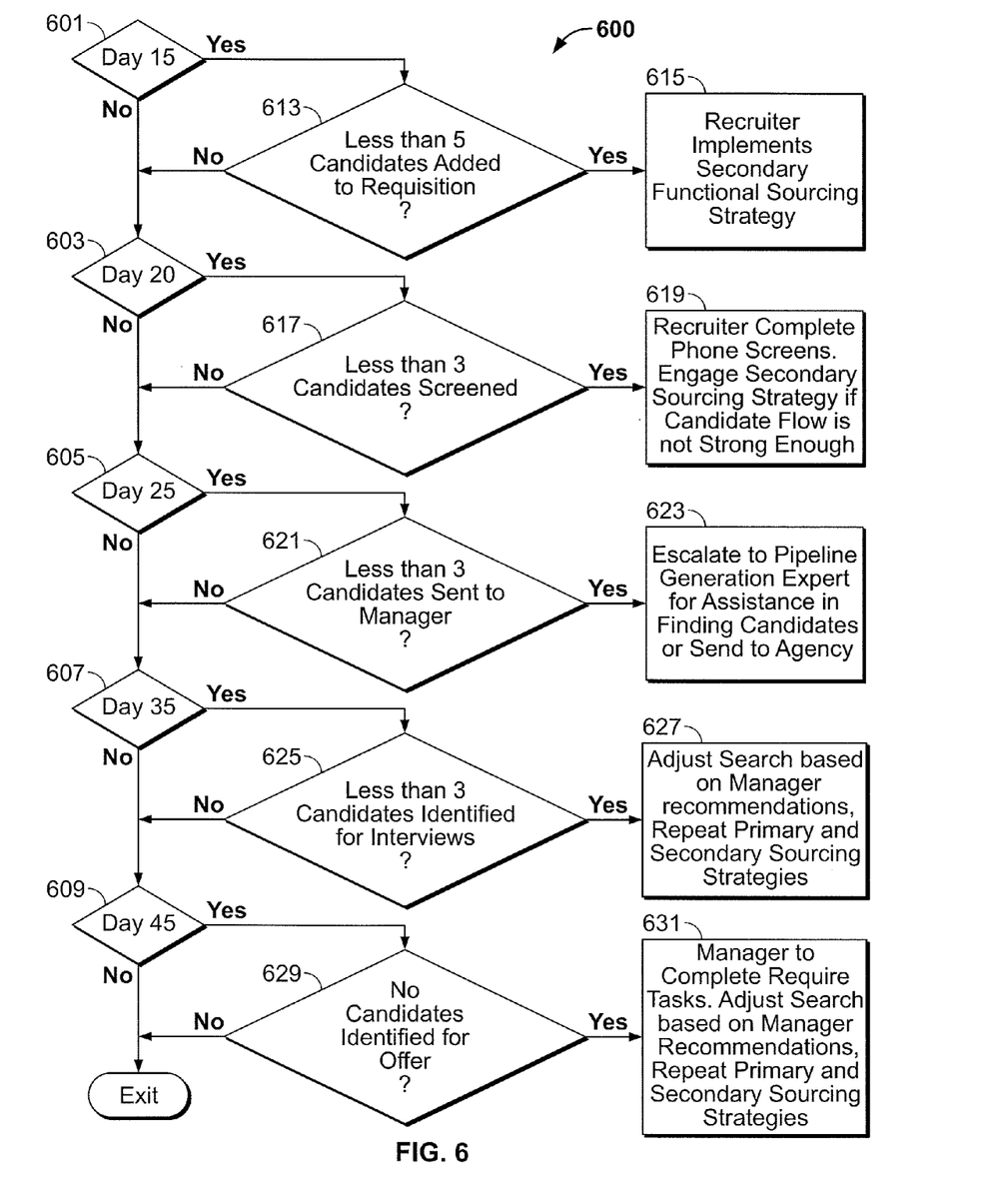
FIG. 6 shows a flow diagram for processing external requisitions for salaried employees in accordance with an embodiment of the invention.

FIG. 6 shows flow diagram 600 for processing external requisitions for salaried employees in accordance with an embodiment of the invention. While steps 601, 603, 605, 607, and 609 correspond to steps 501, 503, 505, 507, and 509 as shown in FIG. 5, requisition stages may be partitioned differently for different requisition types and different salary types.

Steps 613, 617, 621, 625, and 629 determine whether the number of candidates is less than the corresponding candidate volume thresholds for Added to Requisition stage, Screening stage, Sent to Manager (Presented) stage, Interviewing/Assessment stage, and Offer stage, respectively. The configuration information that is used in flow diagram 600 corresponds to the configuration information as shown in screenshot 300 (i.e., fields 301-305 and fields 307-311). Moreover, configuration information may vary for different requisition types and different salary types (e.g., as illustrated in FIGS. 5 and 6). Based on the detected decision point, a corresponding action is indicated by steps 615, 619, 623, 627, and 631.

Figure 7:
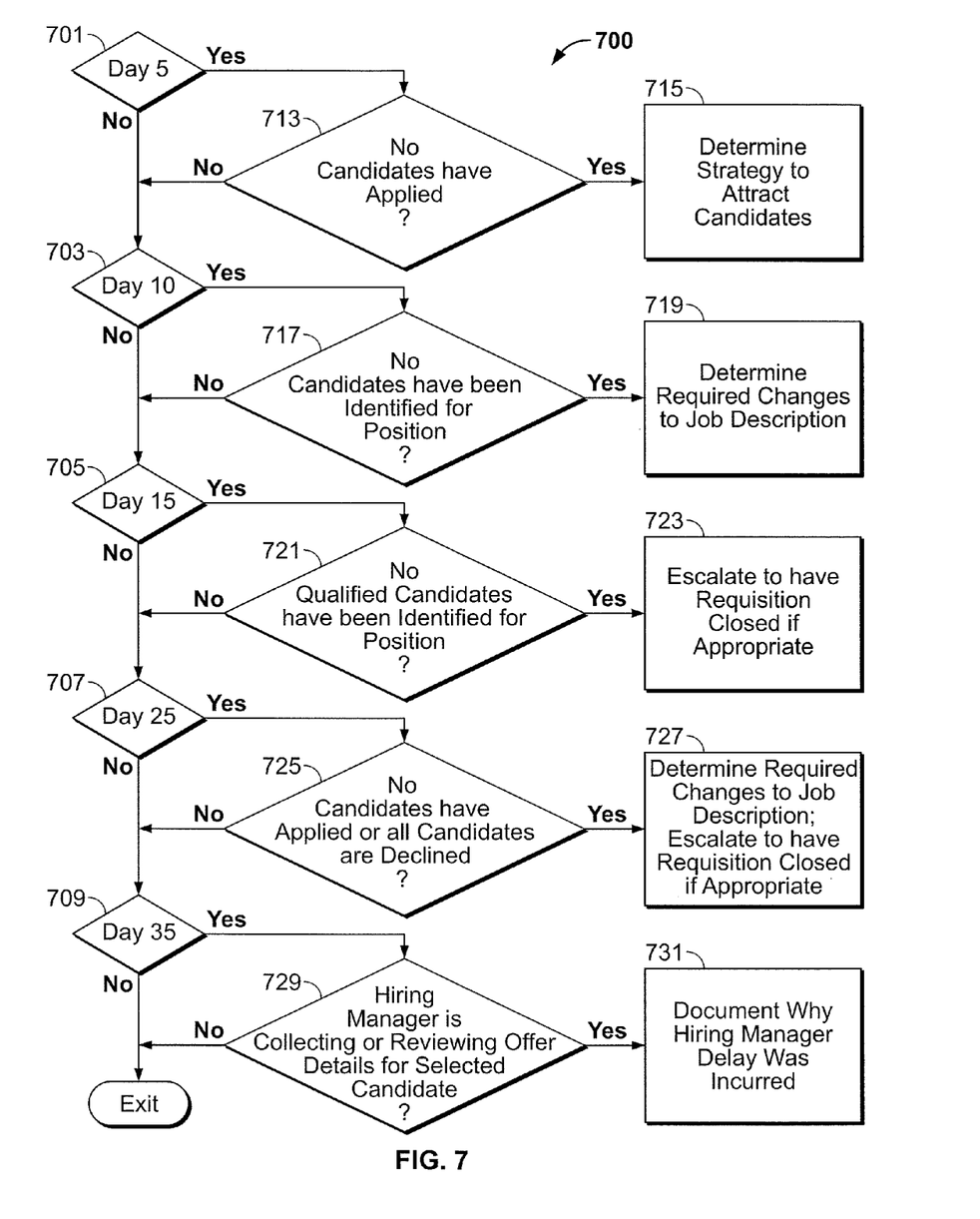
FIG. 7 shows a flow diagram for processing internal requisitions for hourly employees in accordance with an embodiment of the invention.

FIG. 7 shows flow diagram 700 for processing internal requisitions for hourly employees in accordance with an embodiment of the invention. The requisition interval is partitioned into the Added to Requisition stage (step 701: between 0 and 5 days), Screening stage (step 703: between 6 and 10 days), Sent to Manager (Presented) stage (step 705: between 11 and 15 days), Interviewing/Assessment stage (step 707: between 16 and 25 days), and Offer stage (step 709: between 26 and 35 days). Steps 713, 717, 721, 725, and 729 determine whether the number of candidates at a requisition stage is less than the corresponding candidate volume thresholds. With the illustrative embodiment, the requisition interval is partitioned differently for hourly candidates versus salaried candidates (e.g., comparing process 500 and 700). If a decision point is detected by steps 713, 717, 721, 725, or 729, a corrective action may be indicated on a computer display (e.g., display 142 as shown in FIG. 1) corresponding to steps 715, 719, 723, 727, or 731, respectively.

Figure 8:
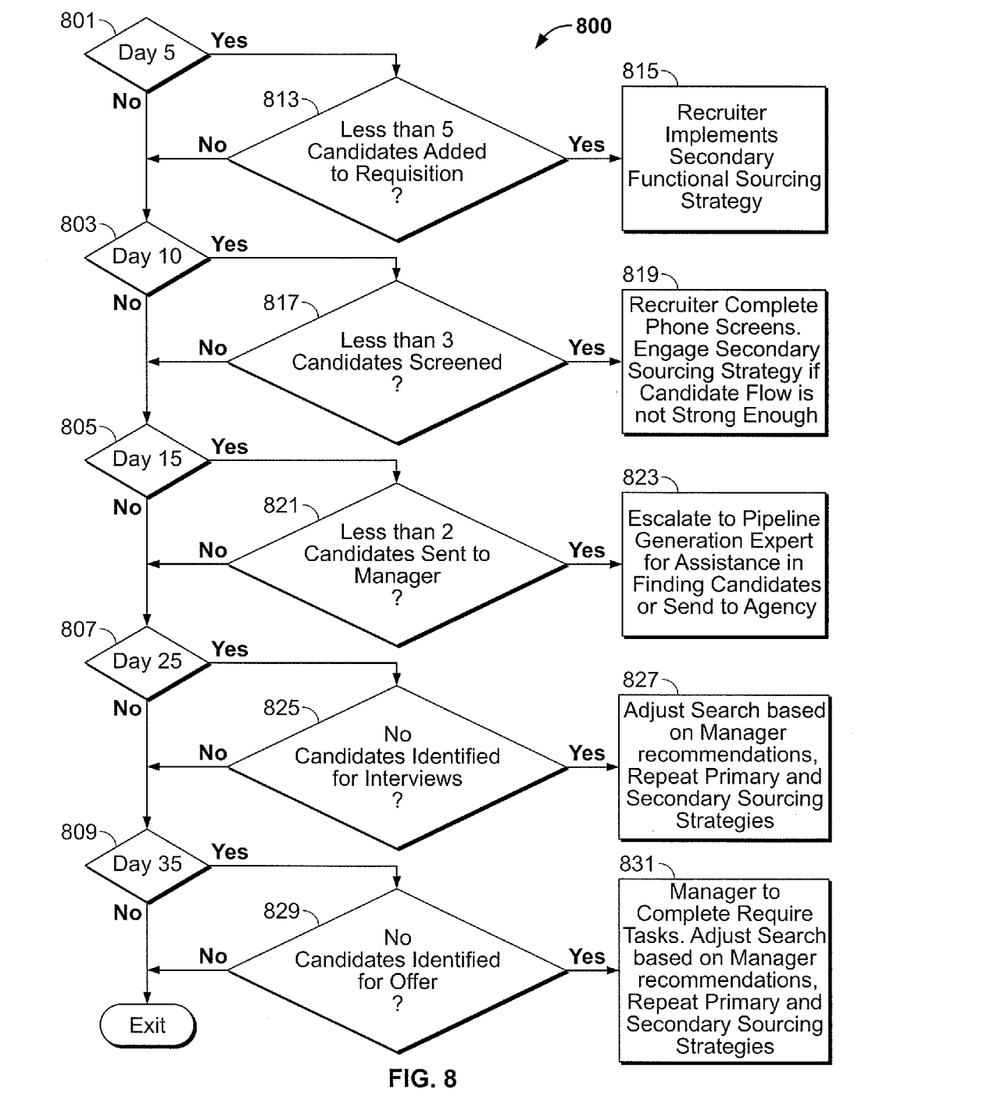
FIG. 8 shows a flow diagram for processing external requisitions for hourly employees in accordance with an embodiment of the invention.

FIG. 8 shows flow diagram 800 for processing external requisitions for hourly employees in accordance with an embodiment of the invention. Steps 801, 803, 805, 807, and 809 correspond to steps 701, 703, 705, 707, and 709 as shown in FIG. 7. Steps 813, 817, 821, 825, and 829 determine whether the number of candidates at a requisition stage is less than the corresponding candidate volume thresholds for Added to Requisition stage, Screening stage, Sent to Manager (Presented) stage, Interviewing/Assessment stage, and Offer stage, respectively. Based on the detected decision point, a corresponding action is indicated by steps 815, 819, 823, 827, and 831.

Figure 9:
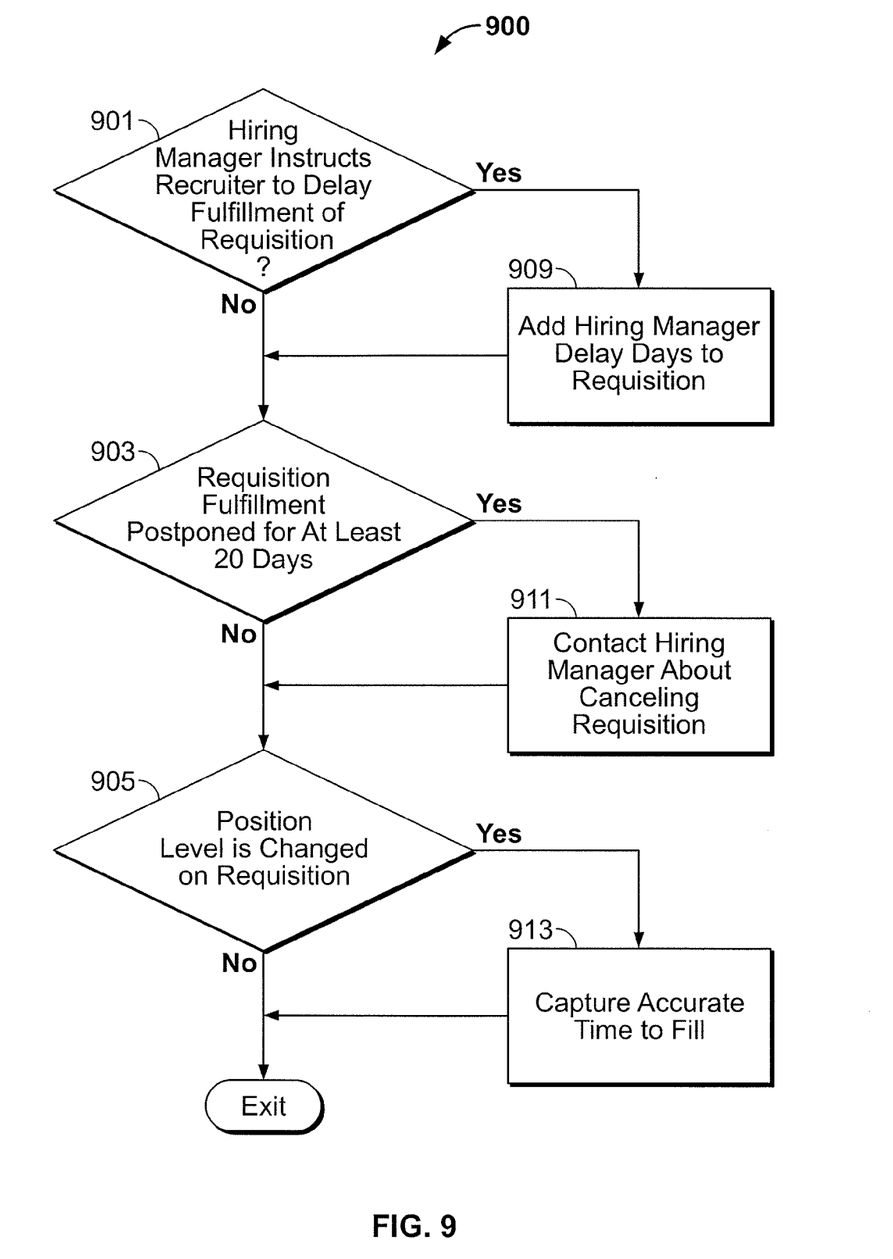
FIG. 9 shows a flow diagram for detecting different types of event scenarios in accordance with an embodiment of the invention.

FIG. 9 shows flow diagram 900 for detecting different types of event scenarios in accordance with an embodiment of the invention. Steps 901, 903, and 905 determine whether predetermined event scenarios occur during the requisition interval regardless of the requisition type and the position type. Steps 909, 911, and 913 correspond to corresponding actions that identified (e.g., generating an action indication on a computer display) when a scenario is detected by steps 901, 903, and 905, respectively.

With some embodiments, communications may be automated and time may be automatically changed. Configuration information may be inputted (e.g., through keyboard 128 as shown in FIG. 1) by specifying event scenarios to be detected. Also, resulting actions from a detected event scenario may be automatically taken in order to reduce or avoid user intervention.

As can be appreciated by one skilled in the art, a computer system with an associated computer-readable medium containing instructions for controlling the computer system may be utilized to implement the exemplary embodiments that are disclosed herein. The computer system may include at least one computer such as a microprocessor, a cluster of microprocessors, a mainframe, and networked workstations.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A computer-implemented method comprising:
    accessing, by an interprocess reporting tool, data associated with an employee requisition process, wherein the data references:
        a requisition interval during which the employee requisition process is to be completed,
        a plurality of stages defined for the employee requisition process, and,
        for each stage, (i) a status associated with the stage, (ii) a candidate volume threshold representing a minimum number of candidates that are to have achieved the status, (iii) a maximum number of days associated with the stage for satisfying the candidate volume threshold, and (iv) a corrective action associated with the stage;
    for each stage, determining a number of candidates that has achieved the status associated with the stage;
    for each stage, determining whether the number of candidates that has achieved the status associated with the stage satisfies the candidate volume threshold;
    for each stage, determining whether a number of days that the employee requisition process has been open exceeds the maximum number of days associated with the stage; and
    for each of one or more stages in which the number of candidates that has achieved the status associated with the stage is determined to not satisfy the candidate volume threshold for the stage and for which the number of days that the employee requisition process has been open exceeds the maximum number of days associated with the stage, presenting the corrective action associated with the stage, for display.

2. The method of claim 1, further comprising:
    presenting an interprocess report for display comprising, for each stage of the employee requisition process, the number of candidates that has achieved the status associated with the stage; and
    for each of one or more stages in which the number of candidates that has achieved the status associated with the stage is determined to not satisfy the candidate volume threshold for the stage and for which the number of days that the employee requisition process has been open exceeds the maximum number of days associated with the stage, including in the interprocess report a flag indication associated with that stage.

3. The method of claim 2,
    wherein each stage further includes an intermediate number of days less than the maximum number of days, and
    wherein the interprocess report includes a flag indication associated with each stage in which the number of candidates that has achieved the status associated with the stage is determined to not satisfy the candidate volume threshold for the stage and for which the number of days that the employee requisition process has been open exceeds the intermediate number of days associated with the stage but fails to exceed the maximum number of days associated with the stage.

4. The method of claim 1, wherein the employee requisition process is one of a plurality of employee requisition processes each having a requisition interval, the method further comprising:
    presenting an interprocess report displaying information on the plurality of employee requisition processes, the information comprising a number of days that each employee requisition process has been open;
    for each of the plurality of employee requisition processes, comparing the number of days that the employee requisition process has been open to a threshold number of days; and
    for each of the plurality of employee requisition processes in which the number of days that the employee requisition process has been open exceeds the threshold number of days, including in the interprocess report a flag indication associated with that employee requisition process.

5. A system comprising:
    one or more computers and one or more storage devices storing instructions that are operable, when executed by the one or more computers, to cause the one or more computers to perform operations comprising:
        accessing data associated with an employee requisition process, wherein the data references:
            a requisition interval during which the employee requisition process is to be completed,
            a plurality of stages defined for the employee requisition process, and
            for each stage, (i) a status associated with the stage, (ii) a candidate volume threshold representing a minimum number of candidates that are to have achieved the status, (iii) a maximum number of days associated with the stage for satisfying the candidate volume threshold, and (iv) a corrective action associated with the stage;
        for each stage, determining a number of candidates that has achieved the status associated with the stage;
        for each stage, determining whether the number of candidates that has achieved the status associated with the stage satisfies the candidate volume threshold;
        for each stage, determining whether a number of days that the employee requisition process has been open exceeds the maximum number of days associated with the stage; and
        for each of one or more stages in which the number of candidates that has achieved the status associated with the stage is determined to not satisfy the candidate volume threshold for the stage and for which the number of days that the employee requisition process has been open exceeds the maximum number of days associated with the stage, presenting the corrective action associated with the stage, for display.

6. The system of claim 5, the operations further comprising:
    presenting an interprocess report for display comprising, for each stage of the employee requisition process, the number of candidates that has achieved the status associated with the stage; and
    for each of one or more stages in which the number of candidates that has achieved the status associated with the stage is determined to not satisfy the candidate volume threshold for the stage and for which the number of days that the employee requisition process has been open exceeds the maximum number of days associated with the stage, including in the interprocess report a flag indication associated with that stage.

7. The system of claim 6,
wherein each stage further includes an intermediate number of days less than the maximum number of days, and
wherein the interprocess report includes a flag indication associated with each stage in which the number of candidates that has achieved the status associated with the stage is determined to not satisfy the candidate volume threshold for the stage and for which the number of days that the employee requisition process has been open exceeds the intermediate number of days associated with the stage but fails to exceed the maximum number of days associated with the stage.

8. The system of claim 5, wherein the employee requisition process is one of a plurality of employee requisition processes each having a requisition interval, and wherein the operations further comprise:
presenting an interprocess report displaying information on the plurality of employee requisition processes, the information comprising a number of days that each employee requisition process has been open;
for each of the plurality of employee requisition processes, comparing the number of days that the employee requisition process has been open to a threshold number of days; and
for each of the plurality of employee requisition processes in which the number of days that the employee requisition process has been open exceeds the threshold number of days, including in the interprocess report a flag indication associated with that employee requisition process.

9. A non-transitory computer-readable medium storing software comprising instructions executable by one or more computers which, upon such execution, cause the one or more computers to perform operations comprising:
accessing, by an interprocess reporting tool, data associated with an employee requisition process, wherein the data references:
a requisition interval during which the employee requisition process is to be completed,
a plurality of stages defined for the employee requisition process, and,
for each stage, (i) a status associated with the stage, (ii) a candidate volume threshold representing a minimum number of candidates that are to have achieved the status, (iii) a maximum number of days associated with the stage for satisfying the candidate volume threshold, and (iv) a corrective action associated with the stage;
for each stage, determining a number of candidates that has achieved the status associated with the stage;
for each stage, determining whether the number of candidates that has achieved the status associated with the stage satisfies the candidate volume threshold;
for each stage, determining whether a number of days that the employee requisition process has been open exceeds the maximum number of days associated with the stage; and
for each of one or more stages in which the number of candidates that has achieved the status associated with the stage is determined to not satisfy the candidate volume threshold for the stage and for which the number of days that the employee requisition process has been open exceeds the maximum number of days associated with the stage, presenting the corrective action associated with the stage, for display.

10. The medium of claim 9, the operations further comprising:
presenting an interprocess report for display comprising, for each stage of the employee requisition process, the number of candidates that has achieved the status associated with the stage; and
for each of one or more stages in which the number of candidates that has achieved the status associated with the stage is determined to not satisfy the candidate volume threshold for the stage and for which the number of days that the employee requisition process has been open exceeds the maximum number of days associated with the stage, including in the interprocess report a flag indication associated with that stage.

11. The medium of claim 10,
wherein each stage further includes an intermediate number of days less than the maximum number of days, and
wherein the interprocess report includes a flag indication associated with each stage in which the number of candidates that has achieved the status associated with the stage is determined to not satisfy the candidate volume threshold for the stage and for which the number of days that the employee requisition process has been open exceeds the intermediate number of days associated with the stage but fails to exceed the maximum number of days associated with the stage.

12. The medium of claim 9, wherein the employee requisition process is one of a plurality of employee requisition processes each having a requisition interval, the operations further comprising:
presenting an interprocess report displaying information on the plurality of employee requisition processes, the information comprising a number of days that each employee requisition process has been open;
for each of the plurality of employee requisition processes, comparing the number of days that the employee requisition process has been open to a threshold number of days; and
for each of the plurality of employee requisition processes in which the number of days that the employee requisition process has been open exceeds the threshold number of days, including in the interprocess report a flag indication associated with that employee requisition process.

* * * * *